April 19, 1927.　　　　B. F. SHIELDS ET AL　　　　1,625,570

SHOCK ABSORBING DEVICE

Filed May 15, 1923　　　　3 Sheets-Sheet 1

INVENTOR
Benjamin F. Shields
Charles G. Crombie
George A. Windell
BY *G. Wright Arnold*
ATTORNEY

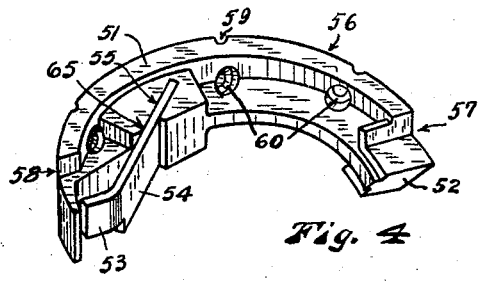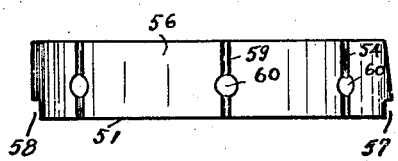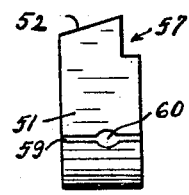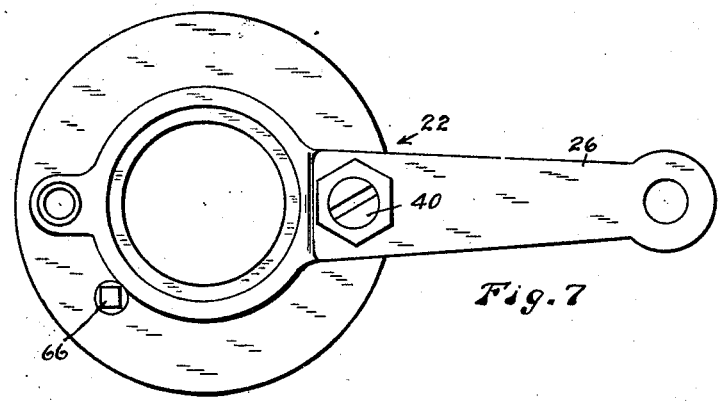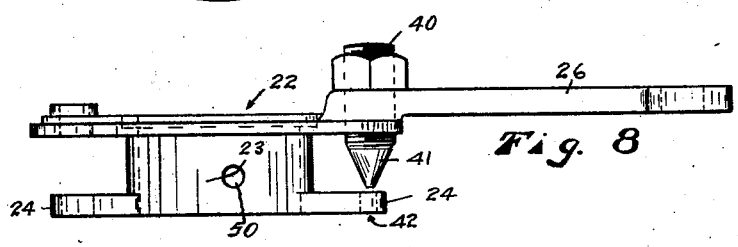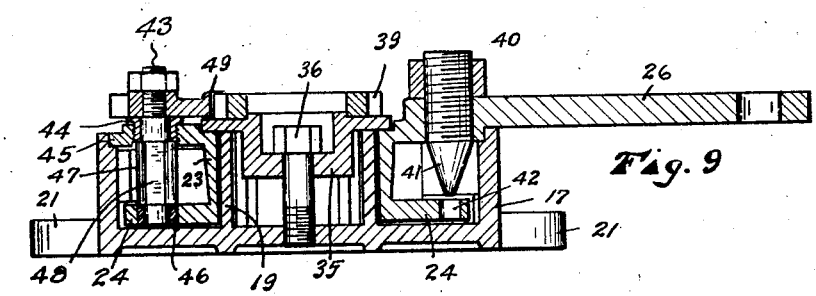

April 19, 1927.

B. F. SHIELDS ET AL 1,625,570

SHOCK ABSORBING DEVICE

Filed May 15, 1923    3 Sheets-Sheet 3

INVENTORS
Benjamin F. Shields
Charles G. Crombie
George A. Windell
BY G. Wright Arnold
ATTORNEY Patented Apr. 19, 1927.

UNITED STATES PATENT OFFICE.

BENJAMIN F. SHIELDS, CHARLES G. CROMBIE, AND GEORGE A. WINDELL, OF SEATTLE, WASHINGTON.

SHOCK-ABSORBING DEVICE.

Application filed May 15, 1923. Serial No. 639,083.

Our invention relates to the art of shock absorbing devices for disposition between the axle and the frame of a spring supported vehicle. More particularly, our invention relates to a device for absorbing excess deflection and rebound strains of the springs of vehicles.

We will set forth our invention as applied to motor vehicles for purposes of clearness and preciseness; however, it is not to be presumed that our invention is limited to any such special application, but is applicable to all instances presenting like problems.

Automobiles are ordinarily provided with springs which are designed and constructed to work efficiently and smoothly when the said automobiles have a normal load and are operated at normal running speeds. When the springs are depressed or deflected beyond this normal sphere, as when an obstruction is encountered, they will rebound beyond their normal position. Naturally, a properly designed shock absorber should operate only to resist excessive compression and excessive rebound action, and should not interfere in any wise with the action of the springs in the normal sphere of said spring action. A serious objection obtains to shock absorbers of present design in use in that they operate to some extent at all times, i. e., the action of said shock absorbers interferes with the action of the springs, even in the sphere of their normal action. A primary object of our invention is to provide a shock absorbing device, which will not interfere with the spring action within said normal sphere, but will operate only to resist excessive compression of the springs and excessive rebound action of the springs.

There have been designed shock absorbing devices which do take into account said normal sphere of action of the springs, i. e., which permit said springs to work unhampered under normal load and under normal conditions. However, a serious objection does obtain to these devices in that when they do commence action, their full braking effect is called into operation at the very beginning of their resisting the excessive deflection and rebound action of the springs. Obviously, such braking action causes a shock to be imparted at the time of the commencement of the braking action. A primary object of our invention is to provide a shock absorbing device which has a zone of inaction, and which provides for a braking effect to be applied gradually when the limits of the neutral sphere are exceeded, whether the same be upon compression or upon rebound.

From the above, it is manifest that some of the devices of the prior art tend to exert a retarding action as soon as any movement of the vehicle spring from its normal position begins, and continues to retard the said spring action with increasing force as the movement increases, thereby having the effect of adding to the stiffness of the spring and causing the vehicle body to ride less easily and smoothly. That type of device usually is arranged to absorb the recoil or rebound of the vehicle body after a sudden compression of the spring. Another type of shock absorbing device, known as the "snubber", freely permits the spring to become compressed, but catches it at the point of greatest deflection and exerts a retarding effect throughout the entire recoil movement of the spring, thus failing to reinforce the spring when it is deflected more than the normal amount, and slowing up the action of the spring by exerting a retarding effect throughout the entire recoil movement. Be it particularly noted that at the very time when the greatest demand is made upon this type of shock absorber, the spring effort is the weakest. As stated, a primary object of our invention is to provide a shock absorber which will operate in both directions, i. e., compressing and recoiling,—and which will meet the increasing force with a gradually increasing resisting or braking effort.

Another very important practical requirement for a shock absorbing device is that it be adapted for use on a wide range of sizes of cars. Obviously, the extra cost of marketing accessories, which involve a large number of different sizes, is often sufficient to prevent their being introduced to the trade. The extra capital, which must be employed for stocking with the various sizes, introduces a severe, and often prohibitive, handicap from the manufacturing and selling point of view. A primary object of our invention is to provide a shock absorbing device characterized by its adaptability for use on a wide range of different sizes of cars.

Correlated with the above is that an accessory of the nature of a shock absorber should be such that there is no right and left hand feature to the device, i. e., so that the absorber need not be made for the one or the other side of the car, and the parts of the same absorber have a fixed relation which adapts it for the one side only. Such requirements demand time and expense in differentiating and keeping separate the right and left hand members of such devices. A primary object of our invention is to provide a shock absorbing device, which is universally adapted, i. e., the one and same device may be applied to either side of the car, and may be readily applied to the front springs of an automobile, as well as to the rear. A further primary object of our invention is to provide a shock absorbing device which has an adjustment which readily adapts it for various positions upon the frame of various makes of automobiles, and is adapted for adjustment without demounting the device from the car. A further primary object of our invention is to provide a shock absorbing device which provides for adjustment which governs the force of the braking action, which adjustment may also be made without demounting the device from the car, so that the device is subject if desired to adjustment for any particular trip involving abnormal use. A further primary object is to provide a shock absorbing device which may be adjusted as respects the means which directly actuates the braking shoe. A further primary object of our invention is to provide a shock absorbing device which may be most economically manufactured, most of the parts of which may be formed by casting or drop forging, and which will be of few and simple parts, said parts being of a character capable of long wearing and having no fabric, either in the form of straps or brake lining. A still further primary object of our invention is to provide a shock absorbing device which will be self-lubricating, and which will have the parts contacting with a pressure, so that thereby, as well as with the aid of said lubricant, objectionable rattle will be eliminated.

The above mentioned general objects of our invention, together with others inherent in the same, are attained by the device illustrated in the following drawings, the same being merely a preferred exemplary form of embodiment of our invention throughout which drawings like reference numerals indicate like parts:

Fig. 4 is a view in perspective of a brake shoe member;

Fig. 5 is a top view of the same;

Fig. 6 is a view in elevation of the end of the brake shoe;

Fig. 7 is a top view of the rotary member;

Fig. 8 is a side view in elevation of the rotary member;

Fig. 9 is a view in section on line 9, 9 of Fig. 1;

Figure 1:
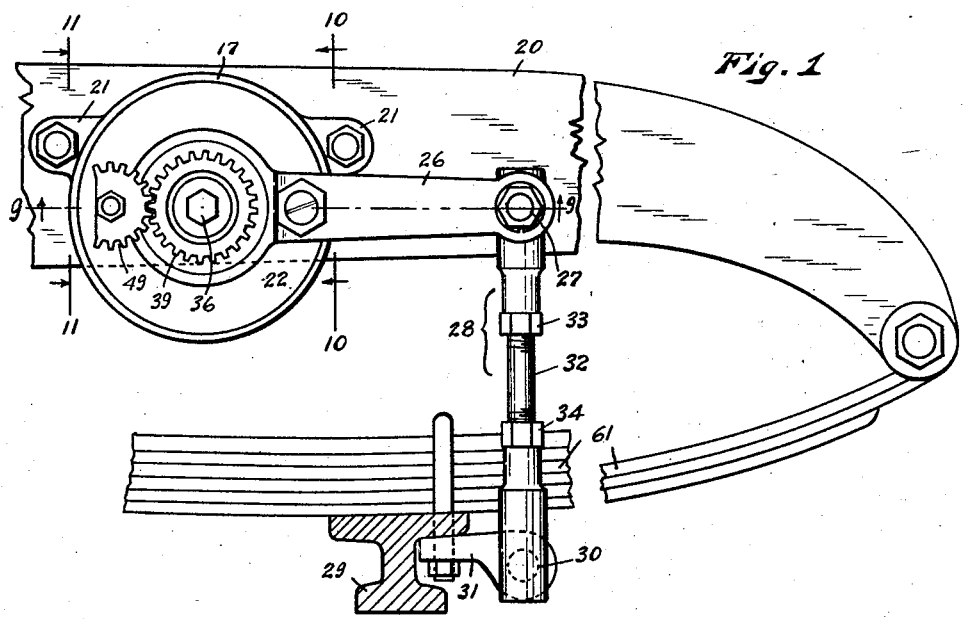
Figure 1 is a view in front elevation of a shock absorber embodying our invention applied to the front spring of an automobile.
Figure 2:
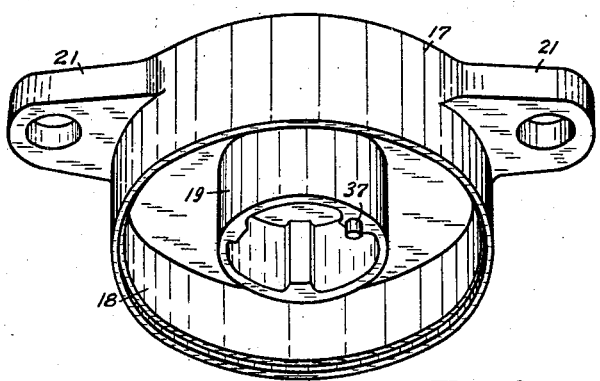
Fig. 2 is a view in perspective showing the inside of the mounting member.
Figure 3:
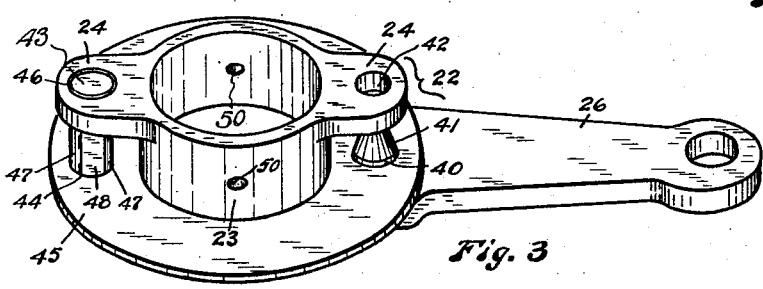
Fig. 3 is a view in perspective showing the inside of the rotary member.
Figures 10, 11:
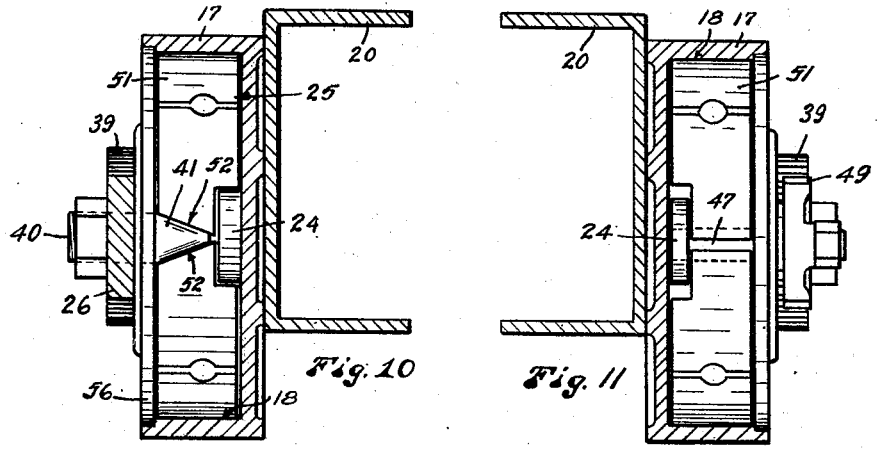
Fig. 10 is a view in elevation on line 10, 10 of Fig. 1 with the drum part of the mounting member broken away.
Fig. 11 is a view in elevation on line 11, 11 of Fig. 1.
Figures 12, 13:
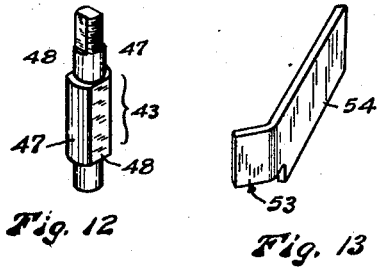
Fig. 12 is a perspective of the cam pin on which the segmental gear is mounted.
Fig. 13 is a view in perspective of the leaf spring of the brake shoe.
Figure 14:
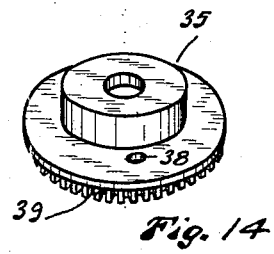
Fig. 14 is a view in perspective of the clamping cover.
Figure 15:
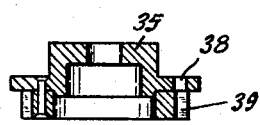
Fig. 15 is a view in section of said cover.

A mounting member 17, having a drum 18 and an axle 19, is secured to the frame channel 20 by lugs 21. A rotary member 22, having a hub 23 with two ears or lugs 24, is provided to fit upon said axle 19 of the mounting member 17, thereby forming a fully enclosed recess 25 between said mounting member 17 and said rotary member 22. Also, integrally formed upon said rotary member is the arm 26, to which is secured, preferably by means of a ball and socket means 27, the connecting rod 28, which rod in turn is secured to the axle 29, preferably by a ball and socket means 30 and a clamping bracket 31. The rod 28 is preferably formed with a middle connecting member 32 threaded on each end, which is provided with lock nuts 33 and 34, so that said rod may be adjusted to the desired length or position. The rotary member is preferably rotatively secured to the mounting member by means of a clamping cover 35, which is secured to the mounting member 17 by means of a bolt 36. (See Figs. 1, 9 and 11). This clamping cover 35 is fixedly mounted upon said mounting member also by means of a lug 37 borne by the mounting member 17, (see Fig. 2), and the recess 38 in the said cover 35, in which recess said lug 37 is disposed to protrude. The lug 37 is preferably formed on a centering rib which provides the necessary metal and, at the same time, lightness of structure. This prevents the rotary motion of the rotary member 22 being imparted to said cover 35. Fixedly mounted upon said clamping cover 35 is preferably disposed the gear 39.

The rotary member is preferably provided with an adjusting bolt 40, having a conical end portion 41, which may be adapted to have a clearing port 42 in the ear 24 of the hub 23. Also said rotary member is provided with a cam pin 43 with a bearing 44 in the flange 45 of the rotary member 22 and a bearing 46 in the ear 24 of said hub 23. This cam pin has the curved parts 47 and the flat parts 48. The cam pin is preferably provided with a segmental gear 49, (see Fig. 1), disposed to intermesh with gear 39. The hub 23 is provided with lubricating ports 50, through which lubricating material may pass from the recess 25 to the axle 19.

In the recess 25 may be disposed two segmental brake shoes 51. Each shoe is preferably provided with a bevelled end portion 52 disposed to bear against the conical end portion 41 of the adjusting bolt 40. Also each brake shoe is provided with a bearing 53 to engage cam pin 43. This bearing is preferably provided through the medium of a spring 54, which is preferably releasably mounted in a slot 55 of the brake shoe. Said slot 55 is preferably disposed in a plane which forms an acute angle with the radius of the brake shoe bearing face 56. This spring 54 has a curved end portion 53 which forms the bearing with the cam pin 43. The full width of the recess 25 is made available for the brake shoes 51 by providing said shoes with offset portions 57 and 58, which permit the ears 24 of the hub 23 to protrude thereacross. The bearing face 56 is preferably provided with transverse grooves 59, said grooves preferably communicating with the recess 25 by means of ports 60. Two such segmental brake shoes 51 are preferably provided and oppositely disposed to each other.

Figure 16:
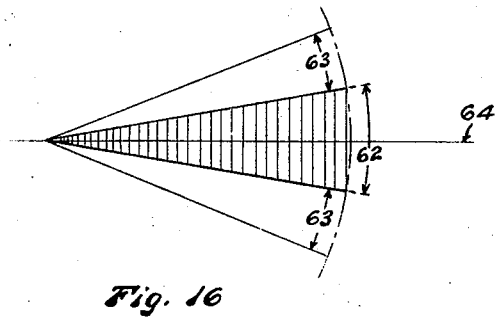
Fig. 16 is a diagram used in describing the mode of operation of the device.

The mode of operation of a shock absorbing device embodying our invention is as follows:

We will assume that the vehicle wheel has met with an obstruction, which has caused the spring 61 of the vehicle to be compressed. This compression moves the rod 28 upwardly, which in turn actuates arm 26 upwardly, which causes rotary member 22 to rotate counter-clockwise, i. e., the hub 23 of the rotary member is caused to revolve through an arc upon the axle 19 of the mounting member 17. Since gear 39 is fixedly mounted upon the axle 19 of said mounting member 17, said gear actuates segmental gear 49 which causes the cam pin 43 to revolve against the spring 54 of the brake shoes. The cam pin in inactive position is adjusted with its flat part 48 against the spring 54, so that rotation of said pin through a small arc does not result in actuating the brake shoes 51 against the drum 18 of the mounting member 17. In short, the vehicle spring 61 is permitted to operate through a certain sphere without any interference by the shock absorber embodying our invention. This sphere of normal action of the spring for small vibrations of the same is diagrammatically represented as occurring through segment 62 in Fig. 16. However, if the force of compression is sufficiently great to cause the cam pin 43 to rotate through a larger arc, so that its curved parts 47 of wider diameter are caused to engage the bearing end portions 53 of the springs 54, then the brake shoe is actuated against the brake drum 18. Manifestly, this force is gradual, so that no sudden shock is felt at the commencement of the operation of the shock absorber. This force is gradually increased in proportion as the cam pin 43 is caused to rotate through a larger arc until the braking operation of the brake shoes is applied forcibly to the drum. The segment 63 of Fig. 16 diagrammatically represents this degree of displacement. As the spring rebounds from the compression, manifestly the cam pin 43 is positively returned to its normal position, and if the vibration is sufficiently great to cause the cam pin to rotate through a sufficient degree of arc, then the braking operation automatically begins again for the segment 63 below the horizontal line 64. Hence, it follows that the operation of a device embodying our invention is such that it does not interfere with the efficient and smooth operating of the vehicle spring within such sphere as said spring may be designed to operate freely, but so soon as the deflection, either by compression or rebound action, goes beyond this normal sphere of action of the spring, then our device is designed to apply a gradually increasing braking effort, so that said spring is re-enforced and in that sphere only of its action for which it was not designed to work smoothly.

Also, be it noted that the parts of the device embodying our invention are positively returned to their normal inactive position, so that they are ready to perform their duty upon meeting the next obstruction.

Also, be it particularly noted that the mechanism for achieving the gradually increasing braking effort is of a very simple nature and construction, so that there is nothing to get out of order, and its operation is in a manner designed to employ parts capable of long wearing, so that the device does not need repairing and attention for adjustment. All parts are of metal, and, therefore, there is no brake lining to be supplied periodically, or any flexible connector to be stretched and to require adjustment as to its length.

There are five adjustments possible in the device embodying our invention: first, by means of the partial segmental gear 49; second, the threaded middle member 32 of rod 28; third, the adjusting bolt 40; fourth, a spring 54 of stronger or stiffer material; and fifth, the change in the fulcrum point 65. These adjustments will be considered seriatim.

Different makes of automobiles have springs variously disposed with respect to the frame. The position of the device on the car may be adjusted to the requirements of different makes of cars, or other requirements as respects the front and rear end of the car, by means of the segmental gear 49, without dis-assembling the mechanism. This may be done by turning the segmental gear to the point where it is out of engagement with the gear 39. Thereupon, the rotary member 22 may be moved to such position as may be desired, and the segmental gear 49 again caused to engage the gear 39, and the rotary member 22 revolved until it assumes the desired position, with the cam pin 43 in neutral position as respects the bearing end portions 53 of the spring 54.

The threaded middle member 32 permits of the lengthening of the rod 28 and the turning of its connecting parts to the desired position as respects the machine, so that this serves as a second adjustment.

A wide range of cars may be accommodated by one size of a device embodying our invention, as it is only necessary to increase the force with which the springs 54 bear upon the flat parts 48 of the cam pin 43. This is accomplished by means of the adjusting bolt 40, which upon being screwed in engages by its conical end portion 41 the bevelled portions 52 of the brake shoes 51, and causes them to move apart, that is, they are caused to bear more forcibly upon the cam pin 43 through the springs 54. Thus, the different strengths of springs of a wide range of cars may be accommodated and the required degree of braking effort supplied to a nicety, with all variations due to different makes, and even individual springs of the same make, being taken into consideration.

For exceptional loads and exceptionally heavy springs, a further adjustment is possible by supplying spring 54 of stronger or stiffer material. However, for very exceptional loads a larger sized absorber would be preferable, so that a larger braking area also may be supplied.

For very light springs, the fulcrum point 65 may be readily ground back so that springs 54 become, so far as their effect is concerned, more flexible.

The recess 25 is preferably filled with lubricating material by removing the grease plug 66. Obviously, the forcing out and in of the brake shoes will create a suction which will operate to draw in the lubricant through the ports 60 to the grooves 59, and as rotary movement develops between the brake shoe 51 and the drum 18, this lubricant will find its way over all parts of the inside of the drum 18, thereby providing for sufficient lubricant to prevent disagreeable squeaking sounds. Also, the mass of lubricant enclosed tends to deaden any rattle which might develop. Moreover, ports 50 permit this lubricant to be supplied to the axle 19. Also, filling the recess 25 with lubricant cooperates in preventing disagreeable rattle of the parts within said recess. The leaf spring 54 being adjusted to bear with a sufficient pressure upon the flat face 48 of the cam pin 43 also prevents disagreeable rattle. The actual experience has proven the efficiency and the absence of all disagreeable rattle with this device, as well as its durability.

Obviously, changes may be made in the form, dimensions and arrangement of the parts of our invention, without departing from the principle thereof, the above setting forth only a preferred form of embodiment.

We claim:—

1. A shock absorber embodying a mounting member; a rotary member operatively disposed in said mounting member; a brake shoe operatively mounted beween said mounting and said rotary members; a cam pin which actuates said brake shoe, said mounting and rotary members forming a housing and completely enclosing said shoe and pin; gear means fixedly mounted on said cam pin; and gear means, intermeshing with said pin gear means, fixedly mounted upon and borne by said mounting member, whereby relative movement beween said mouning and rotary members may be imparted to said cam pin.

2. A shock absorber embodying a mounting member having a drum and axle formed integrally therewith; a rotary member having a hub formed integrally therewith, operatively disposed on said axle of said mounting member; a brake shoe operatively mounted between said mounting and said rotary members; a cam pin which actuates said brake shoe, said mounting and rotary members forming a housing and completely enclosing said shoe and pin; gear means fixedly mounted on said cam pin; and gear means, intermeshing with said pin gear means, fixedly mounted upon and borne by said mounting member, whereby relative movement between said mounting and rotary members may be imparted to said cam pin.

3. A shock absorber embodying a mounting member having a drum and axle formed integrally therewith; a rotary member having a hub formed integrally therewith, operatively disposed on said axle of said mounting member, said hub having an ear on one side thereof; a brake shoe operatively mounted between said mounting and said rotary members; a cam pin carried as respects one end by said rotary member and the other end bearing in said hub ear, said pin actuating said brake shoe, said mounting and rotary members forming a housing and completely enclosing said shoe and pin;

gear means fixedly mounted on said cam pin; and gear means, intermeshing with said pin gear means, fixedly mounted upon and borne by said mounting member, whereby relative movement between said mounting and rotary members may be imparted to said cam pin.

4. A shock absorber embodying a mounting member; a rotary member operatively disposed in said mounting member; a brake shoe operatively mounted between said mounting and said rotary members; a cam pin which actuates said brake shoe, said mounting and rotary members forming a housing and completely enclosing said shoe and pin; segmental gear means fixedly mounted on said cam pin, whereby adjustment of the shock absorber to the desired position on the vehicle may be made; and gear means, intermeshing with said segmental gear, fixedly mounted upon and borne by said mounting member, whereby relative movement between the said mounting and rotary members may be imparted to said cam pin.

5. A shock absorber embodying a mounting member having a drum and axle formed integrally therewith; a rotary member having a hub formed integrally therewith, operatively disposed on said axle of said mounting member; a brake shoe operatively mounted between said mounting and said rotary members; a cam pin which actuates said brake shoe, said mounting and rotary members forming a housing and completely enclosing said shoe and pin; segmental gear means fixedly mounted on said cam pin, whereby adjustment of the shock absorber to the desired position on the vehicle may be made; and gear means, intermeshing with said segmental gear, fixedly mounted upon and borne by said mounting member, whereby relative movement betwen the said mounting and rotary members may be imparted to said cam pin.

6. A shock absorber embodying a mounting member having a drum and axle formed integrally therewith; a rotary member having a hub formed integrally therewith, operatively disposed on said axle of said mounting member, said hub having an ear on one side thereof; a brake shoe operatively mounted between said mounting and said rotary members; a cam pin carried as respects one end by said rotary member and the other end bearing in said hub ear, said pin actuating said brake shoe, said mounting and rotary members forming a housing and completely enclosing said shoe and pin; segmental gear means fixedly mounted on said cam pin, whereby adjustment of the shock absorber to the desired position on the vehicle may be made; and gear means, intermeshing with said segmental gear, fixedly mounted upon and borne by said mounting member, whereby relative movement between the said mounting and rotary members may be imparted to said cam pin.

7. A shock absorber embodying a mounting member; a rotary member operatively disposed on said mounting member; two segmental brake shoes oppositely disposed between said mounting and said rotary members; a cam pin which actuates said brake shoes, said mounting and rotary members forming a housing and completely enclosing said shoes and pin; gear means fixedly mounted on said cam pin; and gear means, intermeshing with said pin gear means, fixedly mounted upon and borne by said mounting member, whereby relative movement between said mounting and rotary members may be imparted to said cam pin.

8. A shock absorber embodying a mounting member having a drum and axle formed integrally therewith; a rotary member having a hub formed integrally therewith, operatively disposed on said axle of said mounting member; two segmental brake shoes oppositely disposed between said mounting and said rotary members; a cam pin which actuates said brake shoes, said mounting and rotary members forming a housing and completely enclosing said shoes and pin; gear means fixedly mounted on said cam pin; gear means, intermeshing with said pin gear means, fixedly mounted upon and borne by said mounting member, whereby relative movement between the said mounting and rotary members may be imparted to said cam pin.

9. A shock absorber embodying a mounting member having a drum and axle formed integrally therewith; a rotary member having a hub formed integrally therewith, operatively disposed on said axle of said mounting member, said hub having an ear on one side thereof; two segmental brake shoes oppositely disposed between said mounting and rotary members; a cam pin which actuates said brake shoes, said mounting and rotary members forming a housing and completely enclosing said shoes and pin; gear means fixedly mounted on said cam pin; gear means, intermeshing with said pin gear means, fixedly mounted upon and borne by said mounting member, whereby relative movement between the said mounting and rotary members may be imparted to said cam pin.

10. A shock absorber embodying a mounting member; a rotary member operatively disposed in said mounting member; a brake shoe operatively mounted between said mounting and said rotary members; an adjusting pin operatively disposed with respect to said brake shoe; a cam pin which actuates said brake shoe, said mounting and rotary members forming a housing and completely enclosing said shoe and cam pin;

gear means fixedly mounted on said cam pin; and gear means, intermeshing with said pin gear means, fixedly mounted upon and borne by said mounting member, whereby relative movement between said mounting and rotary members may be imparted to said cam pin.

11. A shock absorber embodying a mounting member having a drum and axle formed integrally therewith; a rotary member having a hub formed integrally therewith, operatively disposed on said axle of said mounting member; a brake shoe operatively mounted between said mounting and said rotary members; an adjusting pin operatively disposed with respect to said brake shoe; a cam pin which actuates said brake shoe, said mounting and rotary members forming a housing and completely enclosing said shoe and cam pin; gear means fixedly mounted on said cam pin; and gear means, intermeshing with said pin gear means, fixedly mounted upon and borne by said mounting member, whereby relative movement between said mounting and rotary members may be imparted to said cam pin.

12. A shock absorber embodying a mounting member having a drum and axle formed integrally therewith; a rotary member having a hub formed integrally therewith, operatively disposed on said axle of said mounting member, said hub having an ear on one side thereof; a brake shoe operatively mounted between said mounting and said rotary members; an adjusting pin operatively disposed with respect to said brake shoe; a cam pin carried as respects one end by said rotary member and the other end bearing in said hub ear, said cam pin actuating said brake shoe, said mounting and rotary members forming a housing and completely enclosing said shoe and cam pin; gear means fixedly mounted on said cam pin; and gear means, intermeshing with said cam pin gear means, fixedly mounted upon and borne by said mounting member, whereby relative movement between said mounting and rotary members may be imparted to said cam pin.

13. A shock absorber embodying a mounting member; a rotary member operatively disposed in said mounting member; a brake shoe operatively mounted between said mounting and said rotary members; an adjusting pin operatively disposed with respect to said brake shoe; a cam pin which actuates said brake shoe, said mounting and rotary members forming a housing and completely enclosing said shoe and cam pin; segmental gear means fixedly mounted on said cam pin, whereby adjustment of the shock absorber to the desired position on the vehicle may be made; and gear means, intermeshing with said segmental gear, fixedly mounted upon and borne by said mounting member, whereby relative movement between the said mounting and rotary members may be imparted to said cam pin.

14. A shock absorber embodying a mounting member having a drum and axle formed integrally therewith; a rotary member having a hub formed integrally therewith, operatively disposed on said axle of said mounting member; a brake shoe operatively mounted between said mounting and said rotary members; an adjusting pin operatively disposed with respect to said brake shoe; a cam pin which actuates said brake shoe, said mounting and rotary members forming a housing and completely enclosing said shoe and cam pin; segmental gear means fixedly mounted on said cam pin, whereby adjustment of the shock absorber to the desired position on the vehicle may be made; and gear means, intermeshing with said segmental gear, fixedly mounted upon and borne by said mounting member, whereby relative movement between the said mounting and rotary members may be imparted to said cam pin.

15. A shock absorber embodying a mounting member having a drum and axle formed integrally therewith; a rotary member having a hub formed integrally therewith, operatively disposed on said axle of said mounting member, said hub having an ear on one side thereof; a brake shoe operatively mounted between said mounting and said rotary members; an adjusting pin operatively disposed with respect to said brake shoe; a cam pin carried as respects one end by said rotary member and the other end bearing in said hub ear, said cam pin actuating said brake shoe, said mounting and rotary members forming a housing and completely enclosing said shoe and cam pin; segmental gear means fixedly mounted on said cam pin, whereby adjustment of the shock absorber to the desired position on the vehicle may be made; and gear means, intermeshing with said segmental gear, fixedly mounted upon and borne by said mounting member, whereby relative movement between the said mounting and rotary members may be imparted to said cam pin.

16. A shock absorber embodying a mounting member; a rotary member operatively disposed on said mounting member; two segmental brake shoes oppositely disposed between said mounting and said rotary members; an adjusting pin operatively disposed with respect to said brake shoes; a cam pin which actuates said brake shoes, said mounting and rotary members forming a housing and completely enclosing said shoes and cam pin; gear means fixedly mounted on said cam pin; and gear means, intermeshing with said pin gear means, fixedly mounted upon and borne by said mounting member, whereby relative movement between said mounting and rotary members may be imparted to said cam pin.

17. A shock absorber embodying a mounting member having a drum and axle formed integrally therewith; a rotary member having a hub formed integrally therewith, operatively disposed on said axle of said mounting member; two segmental brake shoes oppositely disposed between said mounting and said rotary members; an adjusting pin operatively disposed with respect to said brake shoes; a cam pin which actuates said brake shoes, said mounting and rotary members forming a housing and completely enclosing said shoes and cam pin; gear means fixedly mounted on said cam pin; gear means, intermeshing with said pin gear means, fixedly mounted upon and borne by said mounting member, whereby relative movement between the said mounting and rotary members may be imparted to said cam pin.

18. A shock absorber embodying a mounting member having a drum and axle formed integrally therewith; a rotary member having a hub formed integrally therewith, operatively disposed on said axle of said mounting member, said hub having an ear on one side thereof; two segmental brake shoes oppositely disposed between said mounting and rotary members; an adjusting pin operatively disposed with respect to said brake shoes, a cam pin which actuates said brake shoes, said mounting and rotary members forming a housing and completely enclosing said shoes and cam pin; gear means fixedly mounted on said cam pin; gear means, intermeshing with said pin gear means, fixedly mounted upon and borne by said mounting member, whereby relative movement between the said mounting and rotary members may be imparted to said cam pin.

19. A shock absorber embodying a mounting member; a rotary member operatively disposed in said mounting member; a brake shoe operatively mounted between said mounting and said rotary members; a cam pin which actuates said brake shoe, said mounting and rotary members forming a housing and completely enclosing said shoe and cam pin; means whereby relative movement between the said mounting and rotary members may be imparted to said cam pin; a clamping cover bearing a gear thereon; and a bolt disposed through said clamping cover and threadedly disposed in said mounting member, whereby all of the said parts are held operatively disposed.

20. A shock absorber embodying a mounting member; a rotary member operatively disposed in said mounting member; a brake shoe operatively mounted between said mounting and said rotary members, said brake shoe having a leaf spring disposed in a plane which forms an acute angle with the radius of said brake shoe; a cam pin which bears against said leaf spring of said brake shoe, said mounting and rotary members forming a housing and completely enclosing said shoe and pin; and means whereby relative movement between the said mounting and rotary members may be imparted to said cam pin.

21. In combination with a shock absorber having a cam pin, a brake shoe carrying a leaf spring thereon, said spring forming the bearing means between said cam pin and said brake shoe, whereby objectionable rattle is eliminated and a gradually increasing braking effort is imparted to the brake shoe.

22. A shock absorber embodying a mounting member having a drum and axle formed integrally therewith; a rotary member having a hub formed integrally therewith, operatively disposed on said axle of said mounting member, said hub having an ear thereon; two segmental brake shoes oppositely disposed between said mounting and said rotary members, said brake shoes having holes radially disposed, whereby lubricating material may pass therethrough; an adjusting bolt having a conical end portion carried by said rotary member; a cam pin carried by said rotary member and having an end bearing in said hub ear, said pin actuating said brake shoes, said mounting and rotary members forming a housing and completely enclosing said shoes and pin; segmental gear means fixedly mounted on said cam pin; and gear means, intermeshing with said pin gear means fixedly mounted upon and borne by said mounting member, whereby relative movement between said mounting and rotary members may be imparted to said cam pin.

23. In combination with a shock absorber having a cam pin, a brake shoe carrying a leaf spring thereon, said spring forming the bearing means between said cam pin and said brake shoe, whereby the braking effort is adjusted to check the rebound at the spring's maximum compression and a wave motion imparted thereby to the vehicle.

In witness whereof, we hereunto subscribe our names this 8 day of May, A. D., 1923.

BENJAMIN F. SHIELDS.
CHARLES G. CROMBIE.
GEORGE A. WINDELL.